Sept. 11, 1928.
W. C. BUTTRON
TRAFFIC SIGNAL OBSERVER
Filed April 27, 1927
1,683,951
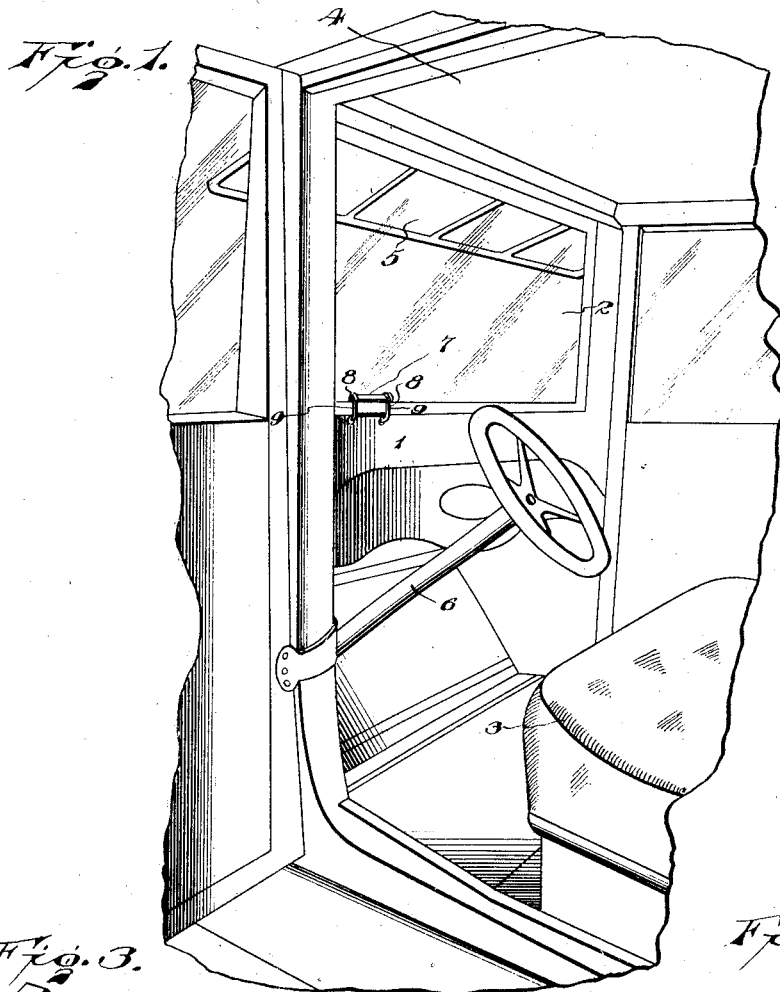
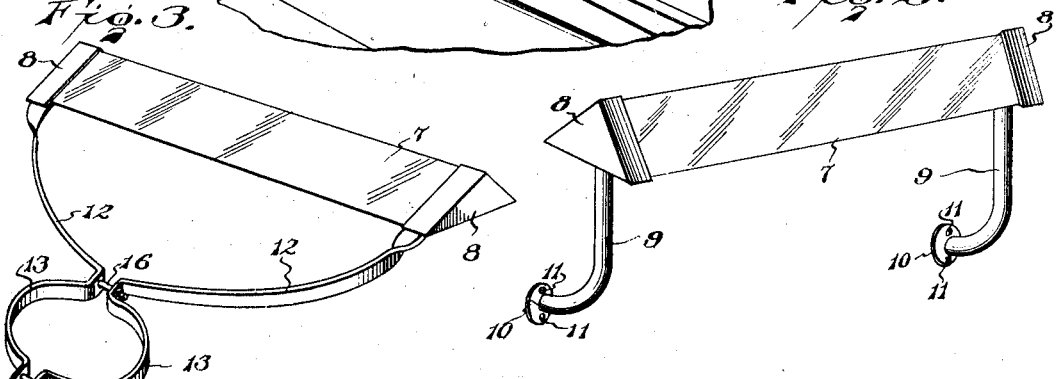
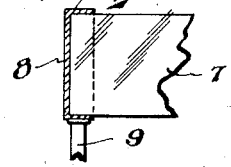
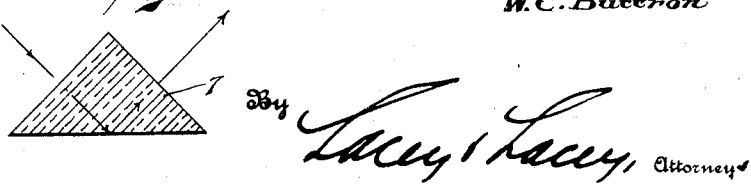
Inventor
W. C. Buttron
By Lacey & Lacey, Attorneys Patented Sept. 11, 1928.

1,683,951

UNITED STATES PATENT OFFICE.

WILLARD C. BUTTRON, OF ALBANY, NEW YORK.

TRAFFIC-SIGNAL OBSERVER.

Application filed April 27, 1927. Serial No. 186,999.

This invention relates to automobile accessories and more particularly to a device by means of which an overhead traffic signal may be observed by the driver of an automobile when close to the signal. At the present time it is customary to erect overhead traffic signals at street intersections and these signals usually consist of different colored lights illuminated by time-controlled means in order to indicate direction in which traffic is to proceed at a street intersection. These traffic lights may be easily seen when an automobile is at some distance from a street crossing but when the automobile is close to a street crossing the top of the automobile or the sun guard at the front of the automobile will often constitute an obstruction which will prevent the driver from seeing the traffic lights. It is, therefore, necessary for the driver to either lean to one side or lean forwardly in order to see the signal. This is very inconvenient and annoying to the driver of an automobile, and, therefore, one object of the invention is to provide a device which may be applied to a portion of an automobile in front of the driver and constitute a reflector by means of which the driver may observe a traffic signal when close to it.

Another object of the invention is to provide a device of this character formed of clear crystal and so shaped that it will constitute a reflector without being silvered or otherwise treated to form a reflecting surface.

The invention is illustrated in the accompanying drawing, wherein

Figure 1 is a perspective view showing a portion of an automobile with one of the traffic observing devices applied thereto;

Fig. 2 is an enlarged perspective view of the traffic observing device shown in Fig. 1;

Fig. 3 is a perspective view of a modified form of traffic observing device intended to be applied to the steering post of an automobile;

Fig. 4 is a view showing one end portion of the improved traffic observing device partially in elevation and partially in section, and Fig. 5 is a diagrammatic view illustrating the manner in which the device operates.

In Fig. 1, the improved traffic signal observing device has been shown applied to the front wall 1 of an automobile close to the windshield 2 and in front of the driver's seat 3 so that an overhead traffic signal which would be obscured by the top 4 or sun guard 5 of the automobile may be observed by a person occupying the driver's seat 3. It will be understood that, while the device has been shown applied to the front wall of the automobile in Fig. 1, it may be mounted at other places, such, for instance, as upon the steering post 6, the cap of a radiator or in any other location which would be found convenient. The crystal 7 which constitutes the main element of the device is formed of glass and consists of a prism. In the form illustrated, the prism is triangular in cross section, as shown in Fig. 5, but it will be understood that it might have other shapes in cross section if found practical. This prism or crystal 7 may be of any length desired and has its ends fitted into caps 8 which may be cemented or otherwise secured upon the prism. Arms 9 extend downwardly from the caps 8 and have their lower end portions provided with heads 10 in which openings 11 are formed to receive securing screws so that the device may be mounted in front of the driver's seat, as shown in Fig. 1.

In Fig. 3, the caps 8 carry arms 12 formed of flat resilient strips which are curved longitudinally to extend in converging relation to each other and are then bent to form jaws 13 having ears 14 projecting from their outer ends. A bolt 15 extends through the ears 14 and a bolt 16 extends through the strips between the arms 12 and jaws 13 so that the jaws may be secured in tight binding engagement about the steering post 6 and thereby support the device upon the steering post where it may be easily seen by the driver of the automobile. When the device is mounted upon the steering post, it may be adjusted thereon and, therefore, so disposed that it may be easily seen by a large or small person operating the automobile.

When the device is in use, it is applied to the automobile in front of the driver's seat and when the automobile approaches a street crossing a reflection of an overhead traffic signal will be caught in the prism, as indicated by the arrows in Fig. 5, and reflected towards the driver. Therefore, the driver of the automobile by observing the reflection in the prism will be able to watch a traffic signal which he could not ordinarily see without looking out of a side window of the automobile or leaning forwardly a sufficient distance to see under the sunshade 5. Therefore, there will be no danger of the driver of an automobile not noticing that the signal had been changed after approaching close to a street crossing and if the driver has stopped at the street crossing he will be ready to immediately respond when the signal is changed and he has the right to cross the intersection.

Having thus described the invention, I claim:

1. A traffic signal viewing device comprising an elongated prism, caps fitted tightly upon the ends of said prism, and mounting arms rigid with said caps extending downwardly therefrom and having their lower end portions curved forwardly and adapted to be firmly secured to the instrument board of a vehicle in front of the driver's seat of the vehicle whereby the prism will be supported in a horizontal position slightly above the lower edge of the windshield of the vehicle and a reflection of a traffic signal in advance of and above the vehicle may be viewed in the prism by the driver of the vehicle.

2. A traffic signal viewing device comprising an elongated prism, caps fitted tightly upon the ends of said prism, and mounting arms rigid with said caps extending downwardly therefrom and adapted to be secured to a support whereby the prism may be supported in a horizontal position in front of the driver's seat of the vehicle and a reflection of a traffic signal in advance of and above the vehicle viewed in the prism by the driver of the vehicle.

In testimony whereof I affix my signature.

WILLARD C. BUTTRON. [L. S.]